US010663043B2

United States Patent
Asakura et al.

(10) Patent No.: US 10,663,043 B2
(45) Date of Patent: May 26, 2020

(54) BALL SCREW DEVICE AND STEERING SYSTEM INCLUDING BALL SCREW DEVICE

(71) Applicant: JTEKT CORPORATION, Osaka-shi, Osaka (JP)

(72) Inventors: Toshihiro Asakura, Chiryu (JP); Takuya Nakayama, Okazaki (JP); Keisuke Ogawa, Toyota (JP)

(73) Assignee: JTEKT CORPROATION, Osaka (JP)

( * ) Notice: Subject to any disclaimer, the term of this patent is extended or adjusted under 35 U.S.C. 154(b) by 91 days.

(21) Appl. No.: 15/854,158

(22) Filed: Dec. 26, 2017

(65) Prior Publication Data
US 2018/0195590 A1 Jul. 12, 2018

(30) Foreign Application Priority Data
Jan. 11, 2017 (JP) .................................. 2017-002743

(51) Int. Cl.
*F16H 25/22* (2006.01)
*F16H 25/24* (2006.01)

(52) U.S. Cl.
CPC ..... *F16H 25/2233* (2013.01); *F16H 25/2214* (2013.01); *F16H 25/2223* (2013.01); *F16H 25/24* (2013.01)

(58) Field of Classification Search
CPC ............................. F16H 25/2223; F16H 25/24
USPC .............. 74/424.81, 424.82, 424.83, 424.84, 74/424.86, 424.87, 424.88, 424.89
See application file for complete search history.

(56) References Cited

U.S. PATENT DOCUMENTS 6,439,072 B1 * 8/2002 Kajita ................. F16H 25/2223
384/43
8,132,479 B2 * 3/2012 Niwa .................. B29C 45/2618
74/424.87
(Continued)

FOREIGN PATENT DOCUMENTS

EP    1 602 858 A1    12/2005
JP    H02-5145 Y2    2/1990
(Continued)

OTHER PUBLICATIONS

May 22, 2018 Extended European Search Report issued in European Patent Application No. EP 18150023.2.

*Primary Examiner* — Jake Cook
*Assistant Examiner* — Gregory Robert Weber
(74) *Attorney, Agent, or Firm* — Oliff PLC

(57) ABSTRACT

There provides a ceiling surface of a deflector which secures an allowance for engagement between a rolling ball and a retainer. A ball screw device includes a ball screw shaft, a ball nut, a deflector forming a coupling passage, a rolling ball, and a retainer. The coupling passage is defined by an outer circumferential ball rolling groove, a ridge, and a ceiling surface. The ceiling surface has a first rounded portion at which a projected shape of the ceiling surface seen in an axial direction has a first radius of curvature at least such that a constant first clearance is provided between the rolling ball and the ceiling surface, and a second rounded portion at which the projected shape has a second radius of curvature smaller than the first radius of curvature and which is located on a groove bottom side of the outer circumferential ball rolling groove.

7 Claims, 12 Drawing Sheets

(56) References Cited

U.S. PATENT DOCUMENTS

| | | | |
|---|---|---|---|
| 2007/0209465 A1* | 9/2007 | Shirai | B23G 1/02 |
| | | | 74/424.71 |
| 2008/0196528 A1* | 8/2008 | Lee | F16H 25/2223 |
| | | | 74/424.86 |
| 2013/0220047 A1* | 8/2013 | Yokoyama | F16H 25/2223 |
| | | | 74/424.87 |

FOREIGN PATENT DOCUMENTS

| | | | |
|---|---|---|---|
| JP | 2000-018360 A | 1/2000 | |
| JP | 5120040 B2 * | 1/2013 | F16H 25/2233 |

* cited by examiner

CIRCUMFERENTIAL PERSPECTIVE

BALL SCREW DEVICE AND STEERING SYSTEM INCLUDING BALL SCREW DEVICE

INCORPORATION BY REFERENCE

The disclosure of Japanese Patent Application No. 2017-002743 filed on Jan. 11, 2017 including the specification, drawings and abstract, is incorporated herein by reference in its entirety.

BACKGROUND OF THE INVENTION

1. Field of the Invention

The present invention relates to a ball screw device and a steering system including a ball screw device.

2. Description of the Related Art

A ball screw device having a retainer at a predetermined position between a ball screw shaft and a ball nut as shown in Japanese Patent Application Publication No. 2000-18360 (JP 2000-18360 A) and Japanese Utility Model Publication No. 2-5145 (JP 2-5145 Y2) has been hitherto known. Pillars formed between retainer grooves of the retainer allow rolling balls that roll along a spiral track formed between the ball screw shaft and the ball nut to roll without coming in contact with one another.

Each of the ball screw devices shown in JP 2000-18360 A and JP 2-5145 Y2 further includes a plurality of deflectors that allow the rolling balls rolling along the spiral track to circulate through one continuous circulation path. This one continuous circulation path is formed by one turn of the spiral track among turns of the spiral track and a coupling passage formed by the deflector.

The coupling passage is formed so as to cross over one ridge between adjacent portions of the spiral track. The coupling passage is defined by a ceiling surface formed on the deflector, an outer circumferential ball rolling groove facing the ceiling surface, and the ridges of the ball screw shaft. When moving inside the coupling passage, the rolling ball enters the coupling passage through an entrance thereof, rolls up a side surface of the outer circumferential ball rolling groove, and crosses over the ridge. Then, the rolling ball rolls down toward an adjacent turn of the spiral track, is discharged through an exit of the coupling passage, and enters the spiral track. To allow the rolling ball to roll smoothly, a predetermined clearance is provided between the rolling ball moving from the entrance to the exit of the coupling passage and the ceiling surface of the deflector.

However, in such a ball screw device, if the clearance between the rolling ball and the ceiling surface of the deflector exceeds a predetermined value, the rolling ball may move across the clearance in a radial direction. As a result, an allowance for engagement between the rolling ball and the retainer decreases, so that the rolling ball may roll onto an outer circumferential surface of the retainer. If the rolling ball rolls onto the outer circumferential surface of the retainer, normal circulation of the rolling balls may be hindered. This phenomenon is likely to occur especially when the rolling ball is on an outer circumferential surface of the ridge, as the allowance for engagement between the rolling ball and the retainer is small. Thus, it is necessary to set the clearance between the rolling ball and the ceiling surface of the deflector to be equal to or smaller than the predetermined value. However, neither of JP 2000-18360 A and JP 2-5145 Y2 mentions the setting of the clearance between the rolling ball and the ceiling surface of the deflector.

SUMMARY OF THE INVENTION

One object of the present invention is to provide a ball screw device in which the shape of a ceiling surface of a deflector is defined such that an allowance for engagement is secured between a rolling ball and a retainer when the rolling ball moves inside a coupling passage, and to provide a steering system including the ball screw device.

A ball screw device according to an aspect of the present invention includes: a ball screw shaft with an outer circumferential ball rolling groove formed spirally in an outer circumferential surface; a ball nut with an inner circumferential ball rolling groove formed spirally in an inner circumferential surface, the outer circumferential ball rolling groove and the inner circumferential ball rolling groove forming a spiral track; a deflector that is provided in the ball nut and forms a coupling passage that crosses over a ridge between adjacent portions of the outer circumferential ball rolling groove; a plurality of rolling balls that are housed in array inside a circulation path formed by substantially one turn of the spiral track and the coupling passage; and a retainer that is disposed between the ball screw shaft and the ball nut and has a retainer groove in which the rolling balls are retained. The coupling passage is defined by the outer circumferential ball rolling groove, the ridge between adjacent portions of the outer circumferential ball rolling groove, and a ceiling surface that is formed on the deflector and faces the outer circumferential ball rolling groove and the ridge. A top surface of the ridge has a shape of a cylindrical surface centered at a central axis of the ball screw shaft. The ceiling surface of the coupling passage has: a first rounded portion at which a projected shape of the ceiling surface seen in an axial direction of the ball screw shaft has a single first radius of curvature centered at the central axis of the ball screw shaft, such that a constant first clearance is provided between the rolling balls and the ceiling surface at least in a range in which the rolling balls are able to roll over the top surface of the ridge; and a second rounded portion at which the projected shape of the ceiling surface has a second radius of curvature smaller than the first radius of curvature and which is located more toward a groove bottom of the outer circumferential ball rolling groove than a range of the first rounded portion.

Thus, the first rounded portion of the ceiling surface is formed such that the constant first clearance is secured between the rolling balls and the ceiling surface at least in the range in which the rolling balls roll over the top surface of the ridge and in which the rolling balls are considered to be most likely to roll onto an outer circumferential surface of the retainer. Therefore, the rolling balls can be reliably prevented from rolling onto the outer circumferential surface of the retainer.

Another aspect of the present invention relates to a steering system including the ball screw device of the above aspect. Thus, a steering system including the ball screw device in which the rolling balls are unlikely to roll onto the outer circumferential surface of the retainer is realized.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
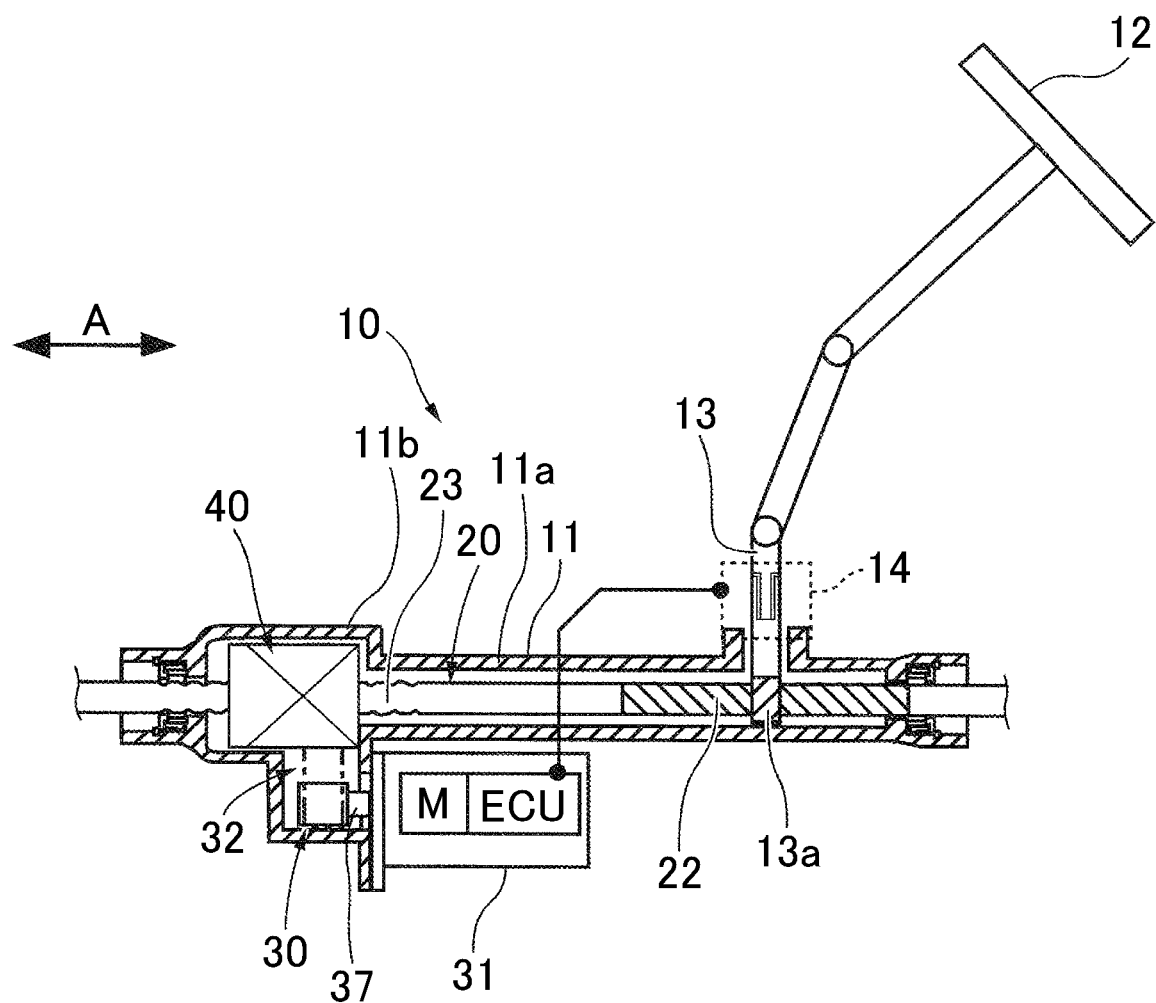
FIG. 1 is a schematic view of an electric power steering system according to the present invention.

An electric power steering system of a first embodiment of the present invention will be described below on the basis of the drawings. FIG. 1 is a view showing the entire electric power steering system as an example in which a ball screw device according to the present invention is applied to an electric power steering system (corresponding to the steering system) of a vehicle.

The electric power steering system augments a steering force with a steering assistance force. The ball screw device of the present invention can be applied to various devices to which a ball screw device is applicable, for example, a four-wheel steering system, a rear-wheel steering system, and a steer-by-wire system, other than an electric power steering system.

An electric power steering system 10 (hereinafter referred to as the steering system 10) changes the direction of steered wheels (not shown) of a vehicle by making a steering operation shaft 20 coupled to the steered wheels reciprocate in an A-direction (right-left direction in FIG. 1) that coincides with an axial direction of the steering operation shaft 20.

As shown in FIG. 1, the steering system 10 includes a housing 11, a steering wheel 12, a steering shaft 13, a torque detector 14, an electric motor M (hereinafter referred to as the motor M), the steering operation shaft 20 (corresponding to the ball screw shaft), a steering assistance mechanism 30, and a ball screw device 40.

The housing 11 is a fixed member fixed to the vehicle. The housing 11 has a cylindrical shape, and the steering operation shaft 20 (screw shaft) passes through the housing 11 so as to be movable in the A-direction. The housing 11 includes a first housing 11a and a second housing 11b that is fixed on one end (left end in FIG. 1) of the first housing 11a in the A-direction.

The steering wheel 12 is fixed at an end of the steering shaft 13 and supported rotatably inside a vehicle cabin. The steering shaft 13 transmits, to the steering operation shaft 20, torque applied to the steering wheel 12 by operation of a driver.

A pinion 13a that constitutes a part of a rack-and-pinion mechanism is formed at an end of the steering shaft 13 on the steering operation shaft 20 side. The torque detector 14 detects torque applied to the steering shaft 13 on the basis of an amount of torsion of the steering shaft 13.

The steering operation shaft 20 extends in the A-direction. A rack 22 is formed on the steering operation shaft 20. The rack 22 meshes with the pinion 13a of the steering shaft 13 and constitutes the rack-and-pinion mechanism together with the pinion 13a. For the rack-and-pinion mechanism, a maximum axial force that can be transmitted between the steering shaft 13 and the steering operation shaft 20 is set on the basis of the use of the steering system 10 etc.

The steering operation shaft 20 further has a ball screw part 23 at a position different from the rack 22. The ball screw part 23 constitutes the ball screw device 40 together with a ball nut 21 to be described later, and a steering assistance force is transmitted to the ball screw part 23 by the steering assistance mechanism 30. Opposite ends of the steering operation shaft 20 are coupled to the right and left steered wheels (not shown) each through a tie rod, a knuckle arm, etc. (not shown), and these steered wheels are steered to right and left through axial movement of the steering operation shaft 20 in the A-direction.

The steering assistance mechanism 30 gives a steering assistance force to the steering operation shaft 20 by using the motor M as a driving source. The steering assistance mechanism 30 includes the motor M, a control unit ECU that drives the motor M, and a driving force transmission mechanism 32. The motor M and the control unit ECU that drives the motor M are housed in a case 31 fixed to the first housing 11a of the housing 11. The control unit ECU determines the steering assistance torque on the basis of an output signal of the torque detector 14, and controls output of the motor M.

Figure 2:
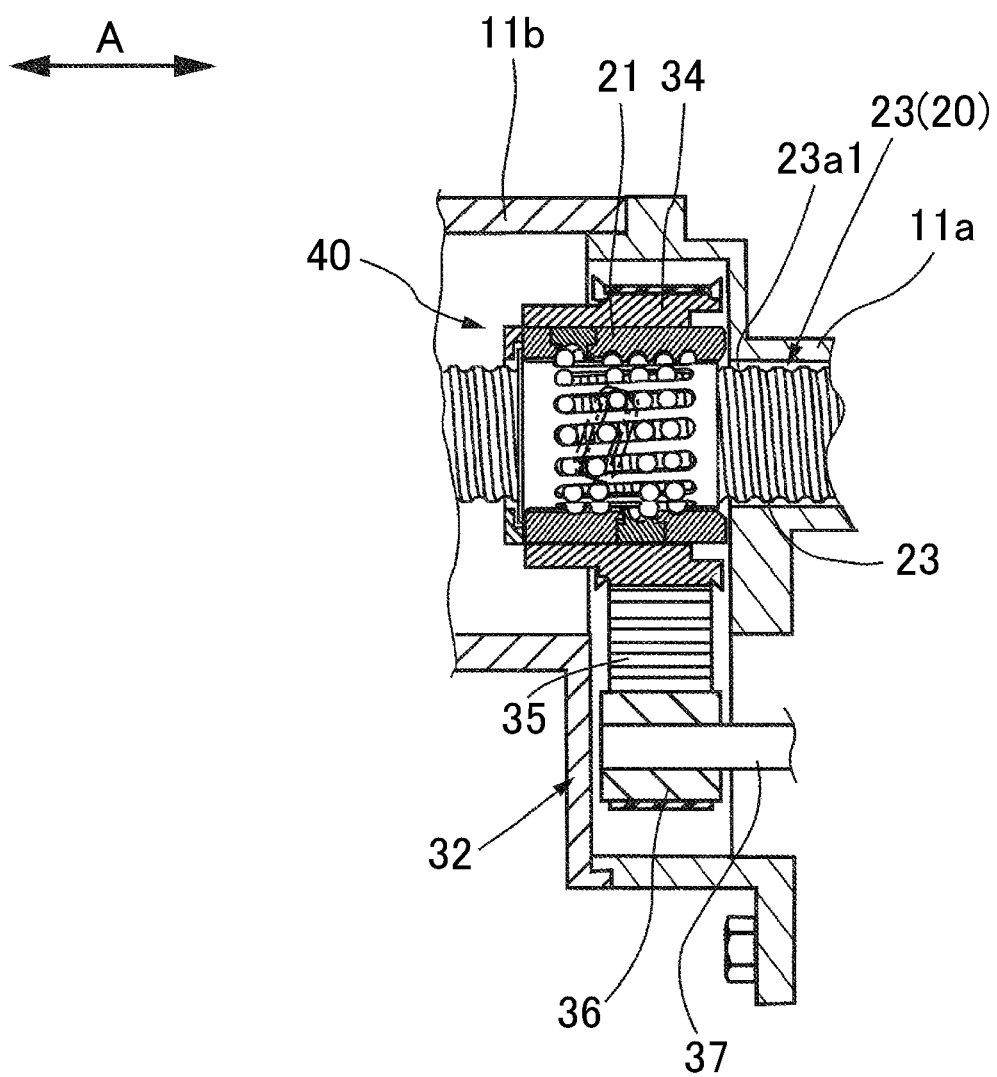
FIG. 2 is an enlarged sectional view of a part of a driving force transmission mechanism of FIG. 1 according to an embodiment.

As shown in FIG. 2, the driving force transmission mechanism 32 includes a drive pulley 36, an idler pulley 34, and a synchronous belt 35. The drive pulley 36 is mounted on an output shaft 37 of the motor M. The output shaft 37 is disposed parallel to an axis (central axis) of the steering operation shaft 20. The idler pulley 34 is disposed on an outer periphery of the ball nut 21 so as to be rotatable integrally with the ball nut 21. An end of the idler pulley 34 on one side in the A-direction (left side in FIG. 2) is rotatably supported on an inner circumferential surface of the second housing 11b through a ball bearing (not shown). The synchronous belt 35 is suspended across the drive pulley 36 and the idler pulley 34. The driving force transmission mechanism 32 transmits a rotational driving force generated by the motor M between the drive pulley 36 and the idler pulley 34 through the synchronous belt 35.

Figure 3:
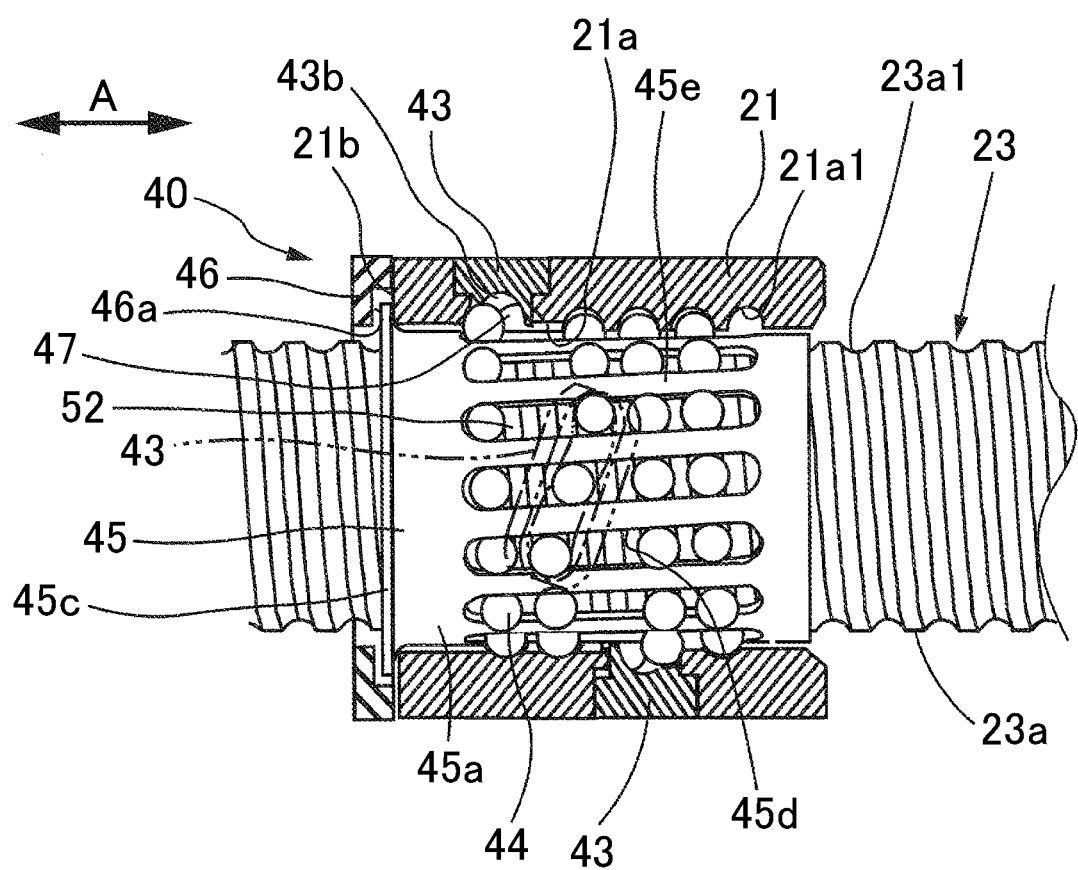
FIG. 3 is a view showing the configuration of a ball screw device of the embodiment.

Next, the ball screw device 40 will be described. As shown in FIG. 2 and FIG. 3, the ball screw device 40 includes the ball screw part 23 of the steering operation shaft 20 (ball screw shaft), the ball nut 21, a plurality of deflectors 43, a plurality of rolling balls 44, a retainer 45, and a wall member 46.

The ball screw part 23 has an outer circumferential ball rolling groove 23a1 that is formed spirally in an outer circumferential surface 23a of the ball screw part 23. The ball nut 21 has a cylindrical shape and is disposed radially outward of the ball screw part 23. An inner circumferential surface 21a of the ball nut 21 has an inner circumferential ball rolling groove 21a1 that is formed spirally. A spiral track 47 is formed between the outer circumferential ball rolling groove 23a1 and the inner circumferential ball rolling groove 21a1 (see the schematic views of FIG. 3 and FIG. 4).

The deflectors 43 are provided on a circumference of the ball nut 21, and each form a coupling passage 43b that crosses over a ridge 52 between adjacent portions of the outer circumferential ball rolling groove 23a1. The ridge 52 will be described in detail later. The deflector 43 allows the rolling balls 44 to circulate, for example, through substantially one turn of the spiral track 47a among a plurality of turns of the spiral track 47. The substantially one turn of the spiral track 47a may be one turn or shorter than one turn.

Figure 4:
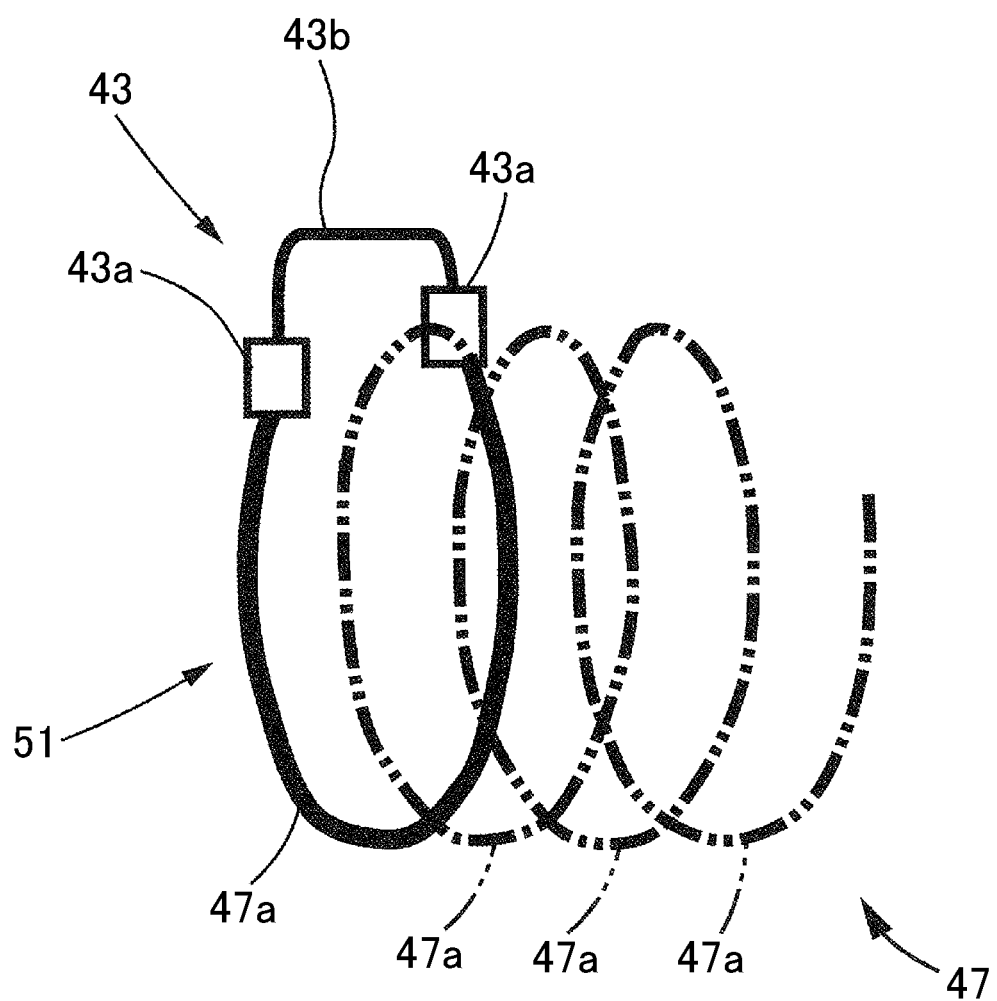
FIG. 4 is a schematic view of a circulation path formed by a spiral track and a deflector.

As shown in the schematic view of FIG. 4, one deflector 43 forms one continuous circulation path 51 by connecting openings 43a, 43a of the coupling passage 43b to predetermined two points in the substantially one turn of the spiral track 47a. These predetermined two points can be set as appropriate. The rolling balls 44 are housed inside the circulation path 51.

Figure 5:
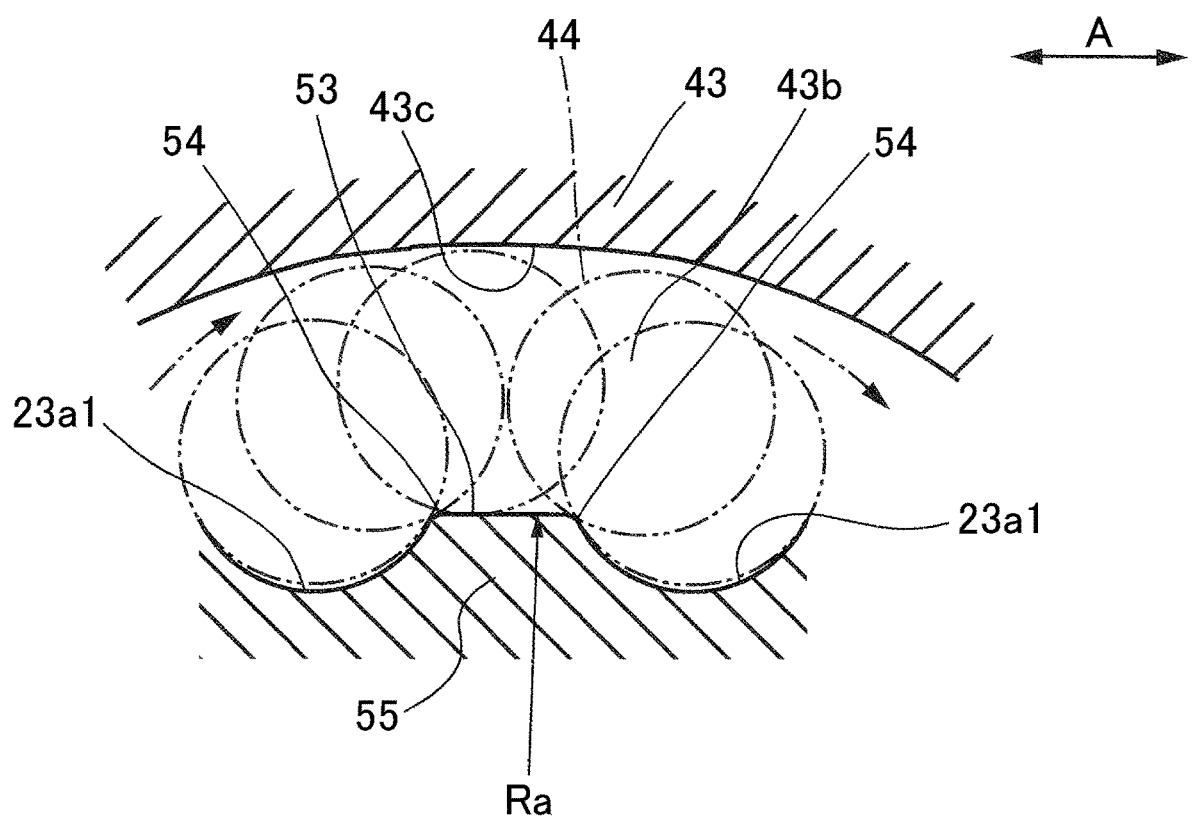
FIG. 5 is a schematic view of a coupling passage from a circumferential perspective.

As shown in FIG. 5, the coupling passage 43b is defined by the outer circumferential ball rolling groove 23a1, the ridge 52 formed between adjacent portions of the outer circumferential ball rolling groove 23a1, and a ceiling surface 43c that is formed on the deflector 43 and faces the outer circumferential ball rolling groove 23a1 and the ridge 52. As will be described in detail later, the shape of the ceiling surface 43c according to the present invention is principally formed so as to correspond to the shape of the ridge 52 facing the ceiling surface 43c. FIG. 5 is a view of a projected shape of one of the coupling passages 43b as seen in a circumferential direction of the steering operation shaft 20.

The rolling ball 44 rolling along the spiral track 47a is guided into the coupling passage 43b through a first opening 43a of the coupling passage 43b and then crosses over the ridge 52 that divides portions of the outer circumferential ball rolling groove 23a1 adjacent to each other in the A-direction. A direction in which the rolling ball 44 thus crosses over the ridge 52 is roughly a circumferential direction of the ball nut 21.

When seen in the axial direction (A-direction) of the steering operation shaft 20 (ball screw shaft), the shape (projected shape) of an outer circumferential surface of the ridge 52 which the rolling ball 44 crosses over has a predetermined radius of curvature Ra. The radius of curvature Ra is centered at the central axis of the steering operation shaft 20, and is equal to a radius of curvature Ra of the outer circumferential surface 23a of the steering operation shaft 20. After crossing over the ridge 52, the rolling ball 44 moves to the outer circumferential ball rolling groove 23a1 to be discharged through a second opening 43a into the spiral track 47a, and rolls along the spiral track 47a again. In this way, the plurality of rolling balls 44 circulate endlessly through the one continuous circulation path 51.

As shown in FIG. 3, the wall member 46 is mounted on an end surface 21b of the ball nut 21. The wall member 46 includes an end surface 46a that faces the end surface 21b of the ball nut 21 across a clearance. The clearance between the end surface 21b and the end surface 46a has such a dimension that a flange part 45c of the retainer 45 to be described later can be accommodated in the clearance.

As shown in FIG. 3, the retainer 45 includes a thin-walled cylindrical part 45a, and the flange part 45c that is provided on an end surface of the cylindrical part 45a on one side (left side in FIG. 3) and can come in contact with the end surface 21b of the ball nut 21. In a radial direction, the cylindrical part 45a is disposed between the outer circumferential surface 23a of the steering operation shaft 20 and the inner circumferential surface 21a of the ball nut 21. The retainer 45 further includes a plurality of retainer grooves 45d which are formed on a circumference of the cylindrical part 45a and in which the plurality of rolling balls 44 are retained.

As shown in FIG. 3, the plurality of retainer grooves 45d each have a long hole shape so as to extend in the A-direction that is the axial direction of the steering operation shaft 20, and are disposed at regular angular intervals (at a regular pitch) on the circumference of the cylindrical part 45a. Each of partition portions 45e in the cylindrical part 45a separates, in the circumferential direction, the retainer grooves 45d that are adjacent to each other in the circumferential direction. The partition portions 45e each have a width sufficiently smaller than a diameter ϕB of the rolling ball 44. Thus, a sufficient number of the rolling balls 44 for meeting a required load capacity of the ball screw device 40 can be arrayed inside the retainer grooves 45d in the cylindrical part 45a of the retainer 45.

The retainer grooves 45d are inclined at a predetermined angle relative to the axis of the steering operation shaft 20 (i.e., an axis of the retainer 45) so as to form a nearly right angle with the outer circumferential ball rolling groove 23a1 of the steering operation shaft 20 and the inner circumferential ball rolling groove 21a1 of the ball nut 21. In other words, the retainer grooves 45d are inclined at an angle equal to a lead angle of the outer circumferential ball rolling groove 23a1 and the inner circumferential ball rolling groove 21a1, and are formed at a right angle to the ball rolling grooves 21a1, 23a1. However, the present invention is not limited to this mode, and the retainer grooves 45d may be formed parallel to the axis of the steering operation shaft 20.

Figure 6:
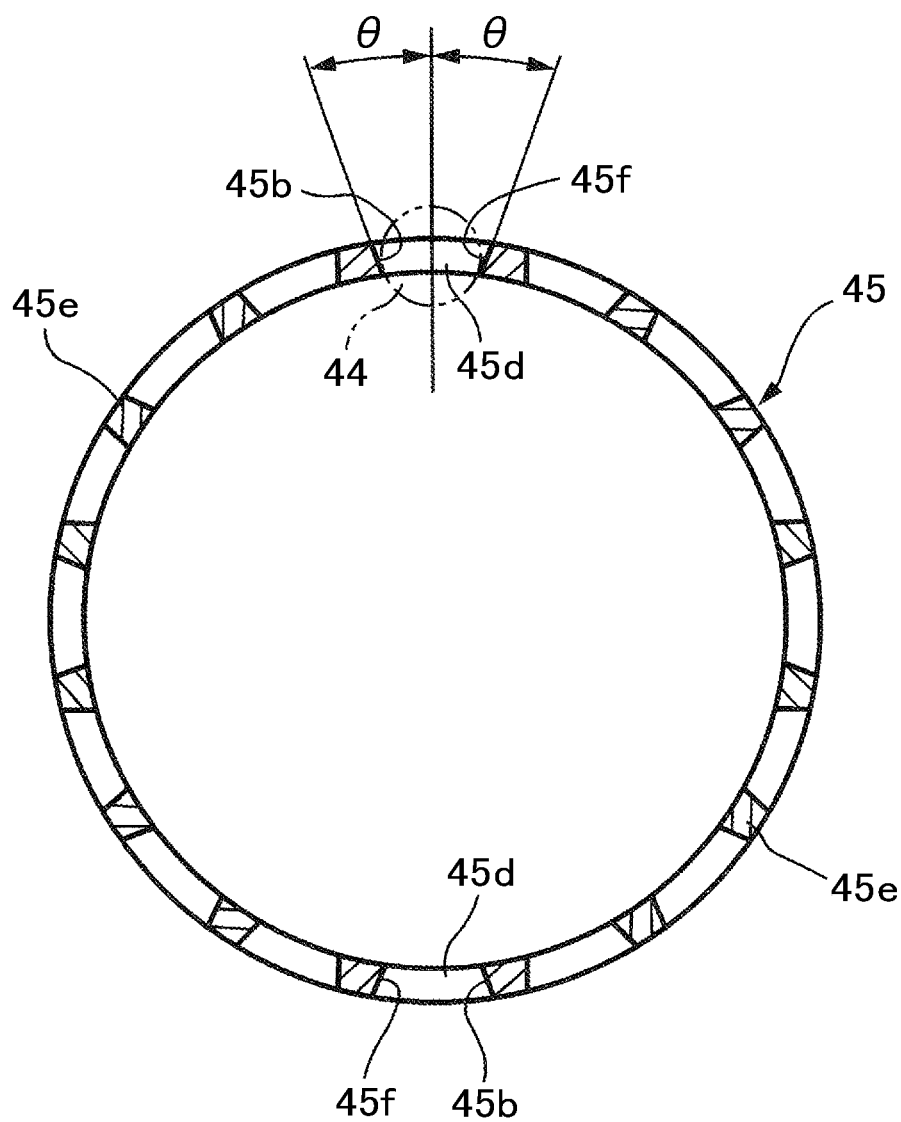
FIG. 6 is a radial sectional view of a cylindrical part of a retainer.

As shown in FIG. 6 that is a sectional view of the retainer 45 perpendicular to the axis thereof, both side surfaces of the retainer groove 45d are formed by inclined surfaces. Specifically, both side surfaces are formed by inclined surfaces 45b, 45f that are inclined at a predetermined angle θ so that the width of the retainer groove 45d increases toward a radially outer side of the cylindrical part 45a. Thus, the cross-section of the retainer groove 45d has a fan shape formed by the inclined surfaces 45b, 45f.

Figure 7:
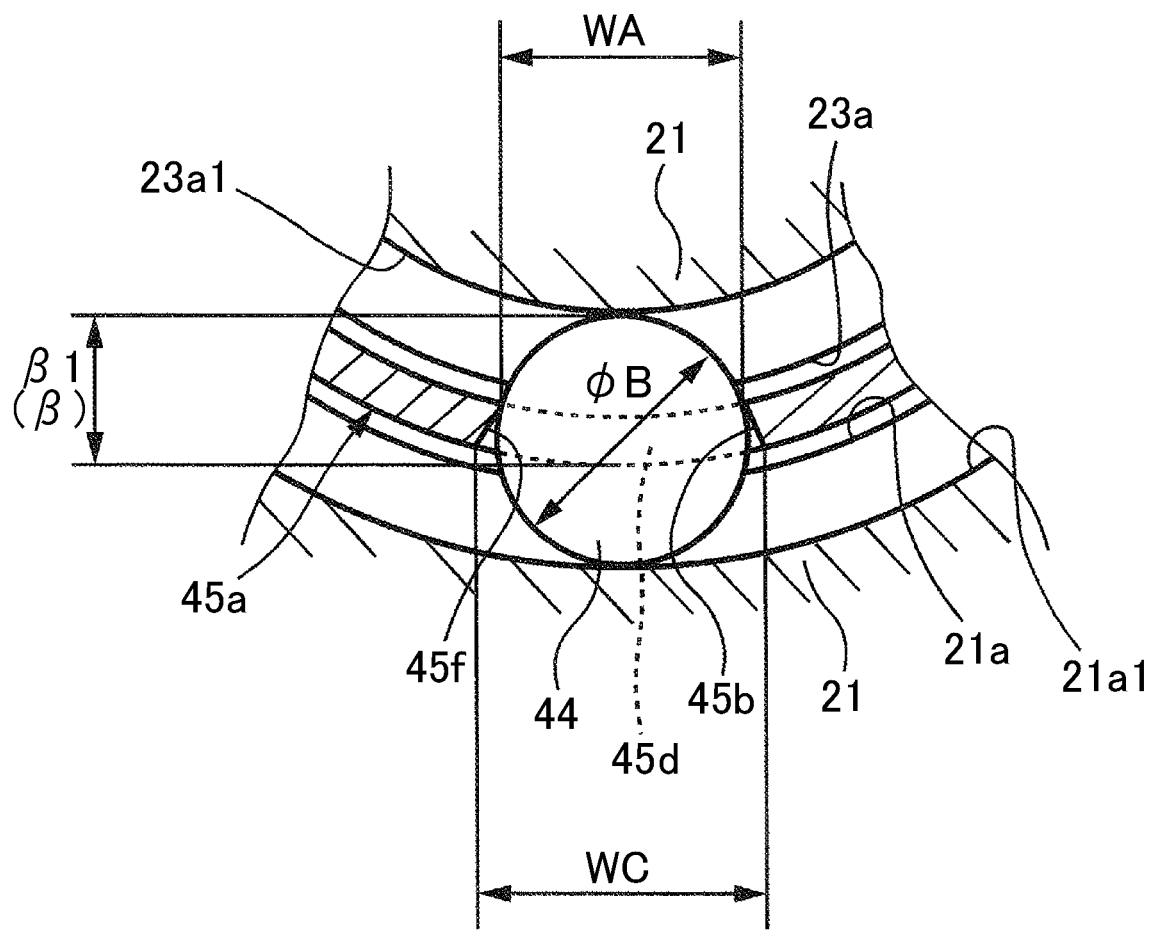
FIG. 7 is a view showing a first state of engagement between the retainer and a rolling ball.

As shown in FIG. 7, the groove width of the retainer groove 45d is defined by the inclined surfaces 45b, 45f so as to be smaller than the diameter ϕB of the rolling ball 44 on an inner circumference of the cylindrical part 45a and to be larger than the diameter ϕB of the rolling ball 44 on an outer circumference of the cylindrical part 45a. Thus, when the groove width of the retainer groove 45d on the inner circumference of the cylindrical part 45a is a groove width WA and the groove width thereof on the outer circumference of the cylindrical part 45a is a groove width WC, a relationship WA<ϕB<WC is satisfied Thus, by the inclined surfaces 45b, 45f (both side surfaces) of the retainer groove 45d, the retainer 45 allows movement of the rolling balls 44 toward a radially outer side of the retainer 45 and at the same time restricts movement of the rolling balls 44 toward a radially inner side of the retainer 45. As a result, as shown in FIG. 7, the inclined surfaces 45b, 45f of the retainer groove 45d located on a lower side come in contact with the rolling ball 44 rolling between the steering operation shaft 20 (ball screw shaft) and the ball nut 21, so that movement of the rolling ball 44 in the radial direction (downward direction in FIG. 7) of the retainer 45 is restricted. Thus, the retainer 45 is kept from coming in contact with the outer circumferential surface 23a of the steering operation shaft 20 or with the inner circumferential surface 21a of the ball nut 21. Accordingly, an allowance for engagement β1 between the retainer 45 and the rolling ball 44 shown in FIG. 7 is maintained at a predetermined value. FIG. 7 is a view showing a state of the rolling ball 44 rolling inside the outer circumferential ball rolling groove 23a1.

Figure 8:
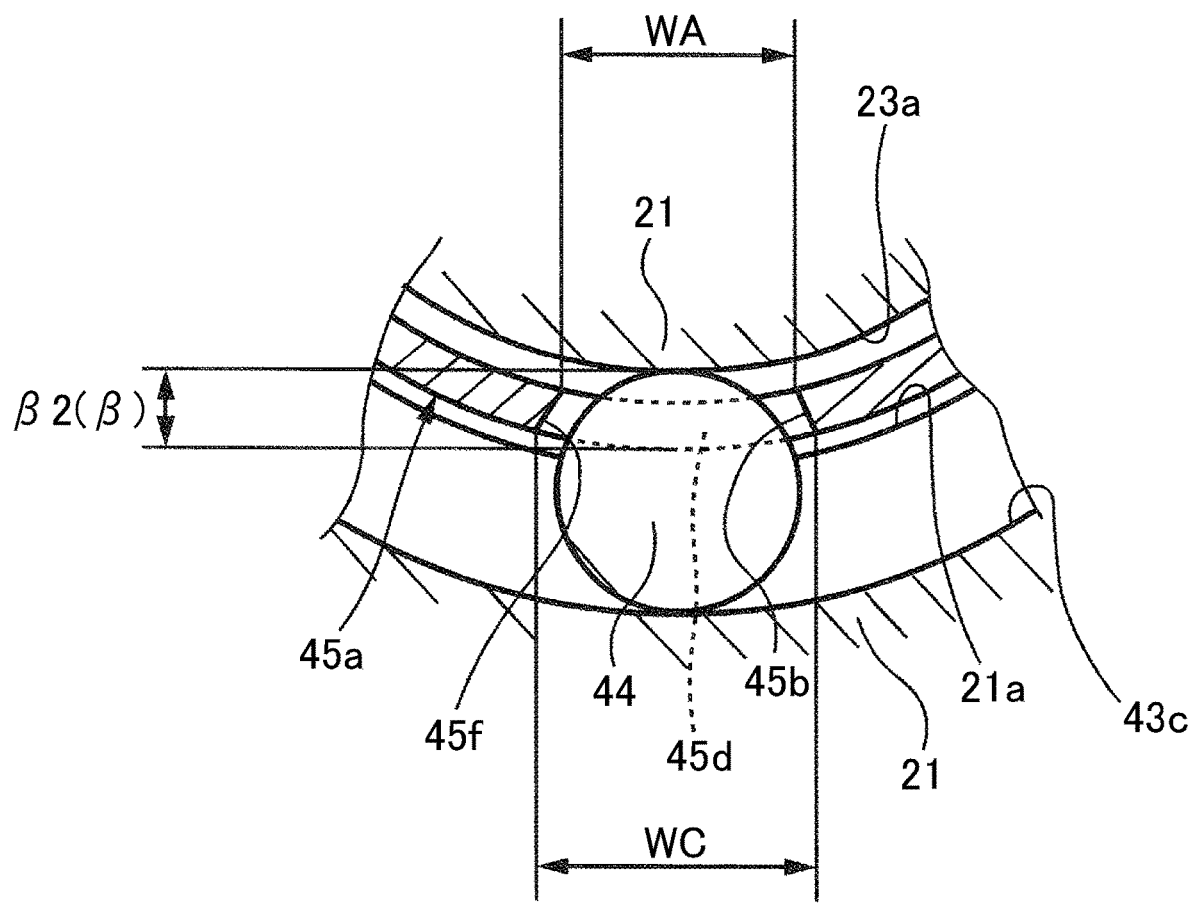
FIG. 8 is a view showing a second state of engagement between the retainer and the rolling ball.

Here, for example, a case will be considered where the rolling ball 44 is rolling over the ridge 52 of the steering operation shaft 20 (ball screw shaft), i.e., the outer circumferential surface 23a of the steering operation shaft 20, to pass through the inside of the coupling passage 43b. In this case, as shown in FIG. 8, an allowance for engagement β2 between the rolling ball 44 and the retainer 45 in the radial direction is smaller than the allowance for engagement 131 when the rolling ball 44 rolls inside the outer circumferential ball rolling groove 23a1.

Accordingly, if a clearance larger than a predetermined clearance α is left between the rolling ball 44 and the ceiling surface 43c of the deflector 43 while the rolling ball 44 is rolling over the ridge 52, the rolling ball 44 may roll onto the outer circumferential surface of the cylindrical part 45a (partition portion 45e) of the retainer 45. The predetermined clearance α here refers to a distance over which the rolling ball 44 can move in the radial direction between the outer circumferential surface of the ridge 52 and the ceiling surface 43c of the deflector 43.

If the rolling ball 44 rolls onto the outer circumferential surface of the partition portion 45e, the rolling ball 44 will be caught between the ceiling surface 43c and the partition portion 45e. This may hinder smooth rolling of the rolling balls 44 and cause a torque variation in the ball screw device 40.

In this embodiment, therefore, the shape of the coupling passage 43b, especially the shape of the ceiling surface 43c of the deflector 43, is set such that the dimension of the clearance between the rolling ball 44 and the ceiling surface 43c matches that of the predetermined clearance α when the rolling ball 44 rolls over the outer circumferential surface of the ridge 52. As described above, the predetermined clearance α has such a dimension that the rolling ball 44 does not roll onto the outer circumferential surface of the partition portion 45e of the retainer 45 even when the rolling ball 44 moves in the radial direction. The dimension of the predetermined clearance α can be derived from a prior experiment etc.

The coupling passage 43b of the deflector 43 will be described. As described above, the coupling passage 43b is defined by the outer circumferential ball rolling groove 23a1, the ridge 52 between adjacent portions of the outer circumferential ball rolling groove 23a1, and the ceiling surface 43c that is formed on the deflector 43 and faces the outer circumferential ball rolling groove 23a1 and the ridge 52.

Figure 9:
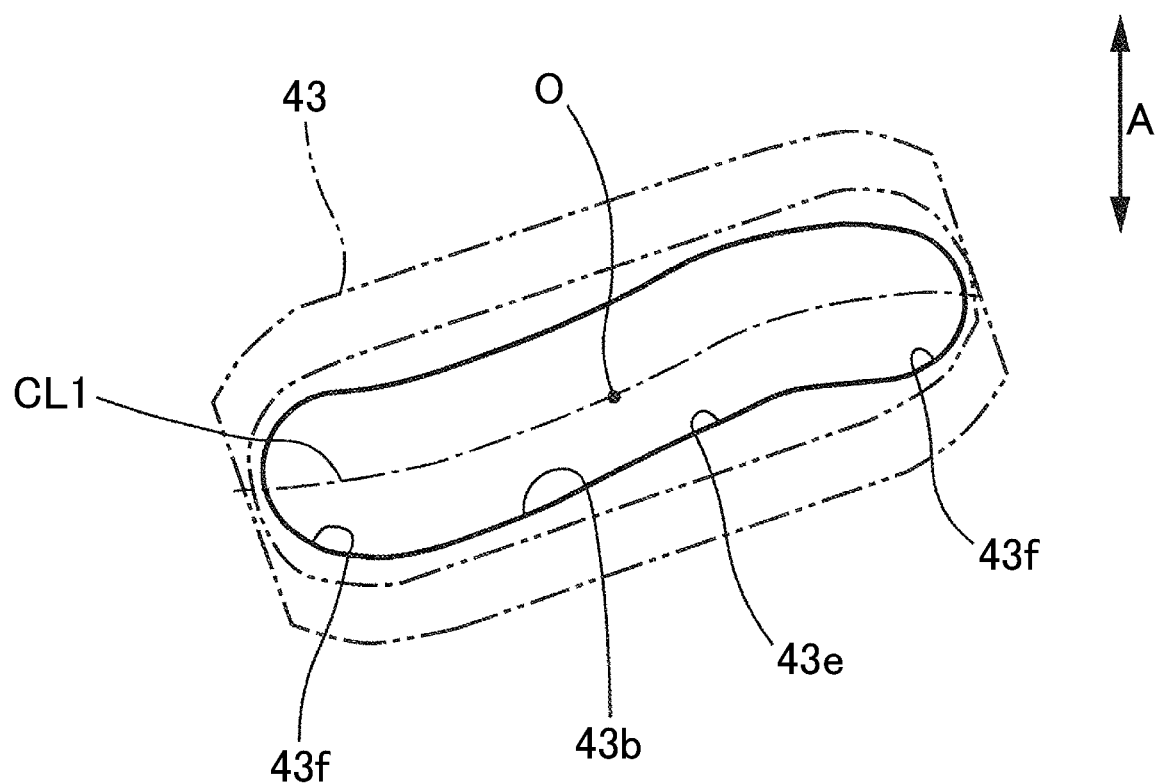
FIG. 9 is a schematic view of the coupling passage from a radial perspective.

FIG. 9 shows a projected shape (projection view) of the coupling passage 43b as seen from a radial perspective. The radial perspective is a perspective of seeing the coupling passage 43b shown in FIG. 3 in the radial direction of the steering operation shaft 20 (ball screw shaft), from the central axis side toward the outer circumference. When seen from the radial perspective, the coupling passage 43b has a substantially S-shape as shown in FIG. 9.

The coupling passage 43b has a straight portion 43e at a central part of the S-shape, and bent portions 43f, 43f at opposite ends of the straight portion 43e. From the radial perspective, a centerline CL1 of the coupling passage 43b in FIG. 9 coincides with a movement trajectory of a center point (center) of the rolling ball 44 when the rolling ball 44 moves as rolling inside the coupling passage 43b.

The bent portions 43f, 43f at the opposite ends are formed at an angle along the outer circumferential ball rolling groove 23a1 so as to allow the rolling balls 44 to flow smoothly from inside the outer circumferential ball rolling groove 23a1 into the coupling passage 43b, or to allow the rolling balls 44 to smoothly enter inside the outer circumferential ball rolling groove 23a1 after being discharged from the coupling passage 43b.

From the radial perspective, the coupling passage 43b has a point-symmetrical shape centered at a center point O of the straight portion 43e. From the radial perspective, the center point O is a point of intersection between the central axis of the steering operation shaft 20 (ball screw shaft) and the centerline CL1 of the coupling passage 43b.

As described above, FIG. 5 is a view showing the projected shapes of the ceiling surface 43c of the deflector 43 and the ridge 52 of the steering operation shaft 20 (ball screw shaft) when the coupling passage 43b is seen in the circumferential direction of the steering operation shaft 20 (ball screw shaft) (the same projection direction as in FIG. 3). Hereinafter, a perspective in this direction will be referred to as the circumferential perspective. FIG. 5 shows the projected shapes of the ceiling surface 43c and the ridge 52 in the direction away from the viewer, with respect to a cutting plane along the centerline CL1 of the coupling passage 43b in FIG. 9. Thus, the projected shape of the ceiling surface 43c shown in FIG. 5 indicates a maximum outside diameter of the coupling passage 43b.

From the circumferential perspective, the ridge 52 includes a top surface 53 and tapered surfaces 54 (see FIG. 5). In this embodiment, the ridge 52 refers to a leading end portion, including the top surface 53 and the tapered surfaces 54, of a wall 55 that is formed between adjacent portions of the outer circumferential ball rolling groove 23a1. The top surface 53 is formed by a part of the outer circumferential surface 23a of the steering operation shaft 20 (ball screw shaft). Accordingly, the top surface 53 has a shape of a cylindrical surface centered at the central axis of the steering operation shaft 20 (ball screw shaft).

The tapered surface 54 is a flat surface connecting the top surface 53 and the outer circumferential ball rolling groove 23a1 to each other. The tapered surface 54 is formed on each side of the top surface 53 of the ridge 52 so as to extend along a direction in which the ridge 52 extends spirally in the steering operation shaft 20.

The ceiling surface 43c provided on the deflector 43 is actually formed so as to extend along a direction in which the centerline CL1 of the coupling passage 43b extends. In this embodiment, however, the shape of the ceiling surface 43c is defined by the projected shape from the circumferential perspective.

Setting of the shape of the ceiling surface 43c will be described on the basis of FIG. 10. For this description, in addition to the view from the circumferential perspective, a view from the radial perspective described above and a view from an axial perspective will be used. These views from the respective perspectives in FIG. 10 show only the straight portion 43e and the bent portion 43f on a first side around the center point O of the point-symmetrical shape of the coupling passage 43b.

Figure 10:
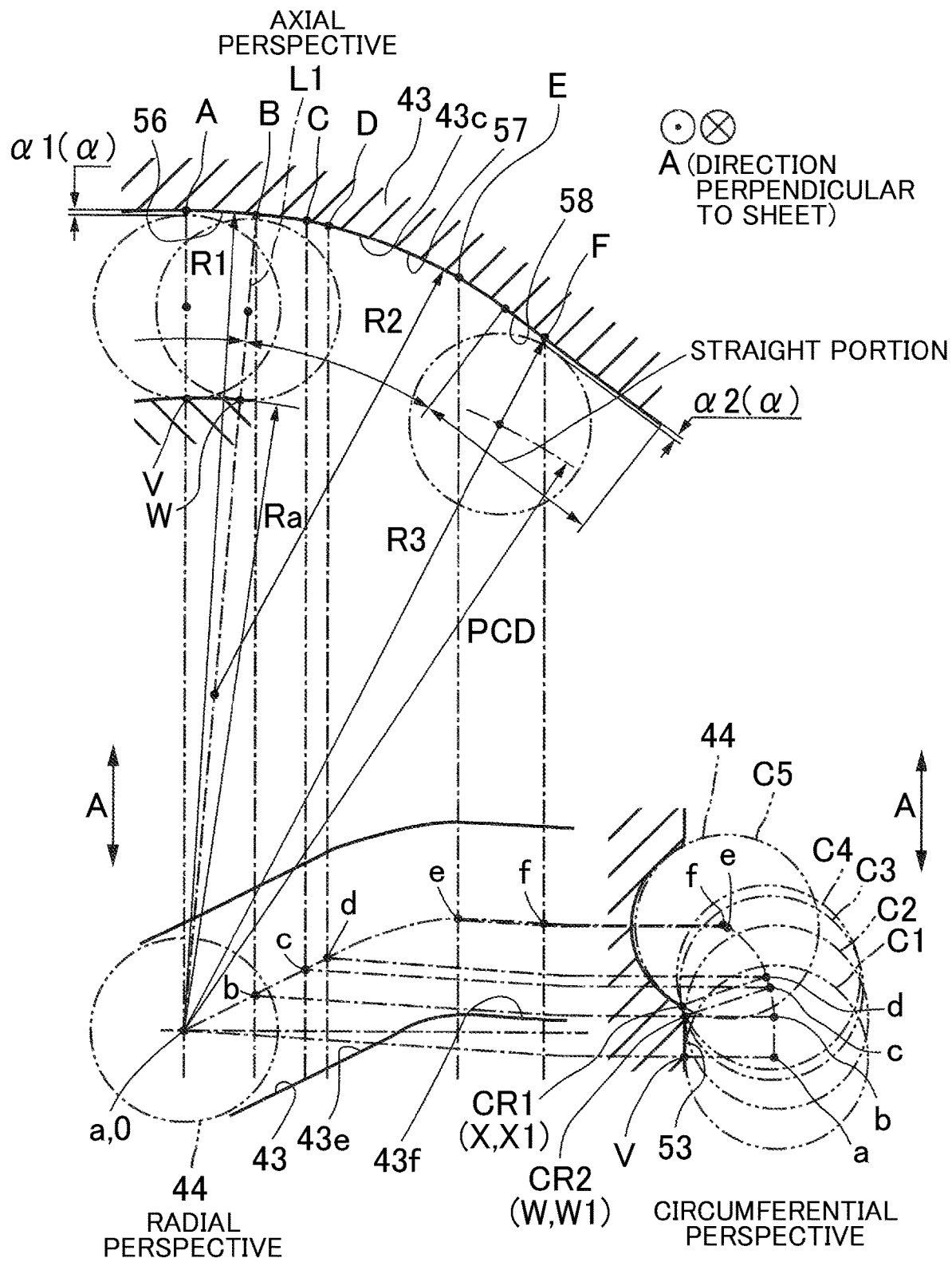
FIG. 10 is a view illustrating the shape of a ceiling surface of the deflector.

As described above, the circumferential perspective is a perspective of seeing the coupling passage 43b in a direction perpendicular to a plane including the central axis of the steering operation shaft 20 (ball screw shaft) and the center point of the rolling ball 44 as shown on the lower right side in FIG. 10. Thus, this direction always varies according to the movement of the rolling ball 44. The view from the circumferential perspective shows the outline of the ridge 52 and the movement of the rolling ball 44 rolling over the ridge 52 as seen from the circumferential perspective.

Figure 11:
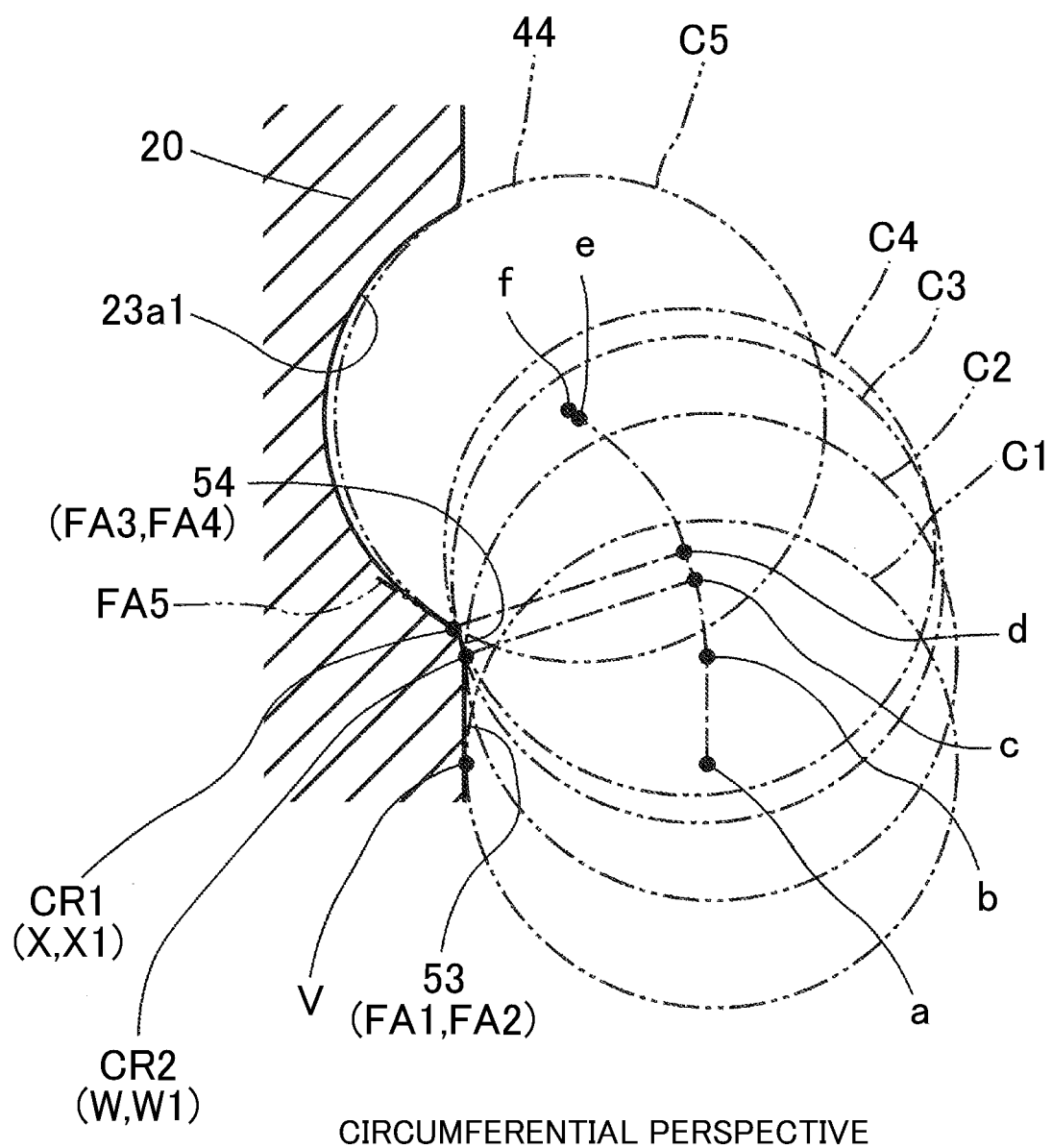
FIG. 11 is an enlarged view of the view from a circumferential perspective in FIG. 10.

First, the radial perspective will be described. In the view from the radial perspective shown in FIG. 10, a center point a to a center point f indicate the positions of the center of the rolling ball 44 moving inside the coupling passage 43b. From the radial perspective, the center point a coincides with a center of the top surface 53, i.e., the center point O of the coupling passage 43b. As shown by a circle C1 indicating the position of the rolling ball 44 from the circumferential perspective, the center point a is the center point of the rolling ball 44 when a contact surface FA1 (see FIG. 11) of the outer circumferential surface of the rolling ball 44 at a point V (=center point O) that is a point of contact with the top surface 53 coincides with the top surface 53 from the circumferential perspective.

The center point b is the position of the center point of the rolling ball 44 in a state where the rolling ball 44 is in contact with a point W on a second line of intersection CR2 that is a line of intersection between the top surface 53 and the tapered surface 54. At this moment, the center point b coincides with the point W from the radial perspective. Moreover, when seen from the circumferential perspective, as shown by a circle C2 indicating the position of the rolling ball 44, a contact surface FA2 (see FIG. 11) of the outer circumferential surface of the rolling ball 44 at the point W coincides with the top surface 53 from the circumferential perspective. Thus, the rolling ball 44 is in contact with the top surface 53 from the circumferential perspective at the point W on the second line of intersection CR2.

The center point c is the position of the center point of the rolling ball 44 in a state where the rolling ball 44 is in contact with a point W1 located on the second line of intersection CR2 that is the line of intersection between the top surface 53 and the tapered surface 54, and where the rolling ball 44 has rotated a predetermined angle with the point W1 serving as a support point. The rotated state is shown in the view from the circumferential perspective (see a circle C3 indicating the position of the rolling ball 44 after rotation). The point W1 is located on the second line of intersection CR2, slightly shifted from the point W.

When seen from the circumferential perspective, as shown by the circle C3, a contact surface FA3 (see FIG. 11) of the outer circumferential surface of the rolling ball 44 at the point W1 coincides with the tapered surface 54 from the circumferential perspective. In other words, the rolling ball 44 is in contact with the tapered surface 54 at the point W1 on the second line of intersection CR2.

The center point d is the position of the center point of the rolling ball 44 in a state where the rolling ball 44 is in contact with a point X located on a first line of intersection CR1 that is a line of intersection between the tapered surface 54 and the outer circumferential ball rolling groove 23a1. The rolling ball 44 at this moment is moving over the tapered surface 54 while maintaining the same inclination relative to the tapered surface 54 as the circle C3 seen from the circumferential perspective (see a circle C4 indicating the position of the rolling ball 44 after movement).

As shown by the circle C4 seen from the circumferential perspective, a contact surface FA4 (see FIG. 11) of the outer circumferential surface of the rolling ball 44 at the point X coincides with the tapered surface 54 from the circumferential perspective. In other words, the rolling ball 44 is in contact with the tapered surface 54 at the point X on the first line of intersection CR1.

The center point e is the position of the center point of the rolling ball 44 in a state where the rolling ball 44 is in contact with a point X1 located on the first line of intersection CR1 that is the line of intersection between the tapered surface 54 and the outer circumferential ball rolling groove 23a1, and where the rolling ball 44 has rotated a predetermined angle with the point X1 serving as a support point. The rotated state is shown in the view from the circumferential perspective (see a circle C5 indicating the position of the rolling ball 44 after rotation). The point X1 is located on the first line of intersection CR1, slightly shifted from the point X.

When seen from the circumferential perspective, as shown by the circle C5, a contact surface FA5 (see FIG. 11) of the outer circumferential surface of the rolling ball 44 at the point X1 coincides with a contact surface of the outer circumferential ball rolling groove 23a1 at the point X1 from the circumferential perspective. In other words, the rolling ball 44 is in contact with the outer circumferential ball rolling groove 23a1 at the point X1 on the second line of intersection CR2.

The center point f is the center point of the rolling ball 44 from the radial perspective in a state where the rolling ball 44 has moved into the outer circumferential ball rolling groove 23a1 and reached the opening 43a of the coupling passage 43b. Accordingly, the radial position of the center point f coincides with a pitch circle diameter (PCD). As the PCD is publicly known, detailed description thereof will be omitted.

Next, setting of the shape of the ceiling surface 43c will be described. As shown in the view from the axial perspective on the upper left side of FIG. 10, the ceiling surface 43c has a first rounded portion 56, a second rounded portion 57, and a straight portion 58 from the axial perspective. In this embodiment, the first rounded portion 56 is set in a range facing a range between the point V and the point W on the top surface 53 of the ridge 52 where the rolling ball 44 moves along the coupling passage 43b.

Thus, the first rounded portion 56 is formed so that a constant first clearance α1 (α) is provided between the rolling ball 44 and the ceiling surface 43c from the axial perspective, in a range in which the center point of the rolling ball 44 moves from the center point a to the center point b from the radial perspective. The constant first clearance α1 here has such a dimension that the rolling ball 44 can roll smoothly inside the coupling passage 43b and that the rolling ball 44 does not roll onto the outer circumferential surface of the retainer 45 even when the rolling ball 44 moves in the radial direction inside the first clearance α1. The first clearance α1 is a clearance corresponding to a radius.

The first clearance α1 is set in advance on the basis of design studies, experimental results, etc. The first rounded portion 56 has a single first radius of curvature R1 centered at the central axis of the steering operation shaft 20 (ball screw shaft). In this embodiment, the first clearance α1 may be defined as a distance between the center of the rolling ball 44 moving along the ceiling surface 43c of the coupling passage 43b and the center of the rolling ball 44 moving along the top surface 53.

Thus, the border of the range of the first rounded portion 56, i.e., the border between the first rounded portion 56 and the second rounded portion 57, is located at a point B (see the view from the axial perspective) that is a point on the ceiling surface 43c and located on an extension of a line L1 connecting the center point b of the rolling ball 44 and the point W in a state where the rolling ball 44 is in contact with the point W and the contact surface FA2 of the outer circumferential surface of the rolling ball 44 coincides with the top surface 53 (see the circle C2 from the circumferential perspective).

In the above case, the first radius of curvature R1 of the first rounded portion 56 can be expressed by the following Formula (1):

$$R1 = Ra + \phi B + \alpha 1 \quad (1)$$

where Ra is the radius of curvature (mm) of the top surface 53 of the ridge 52; ϕB is the diameter (mm) of the rolling ball 44; and α1 is the first clearance (mm).

With the first clearance α1 thus provided, the rolling ball 44 can roll smoothly over the top surface 53 (outer circumferential surface) of the ridge 52 in the range facing the first rounded portion 56. As descried above, the first clearance α1 has such a dimension that the rolling ball 44 does not roll onto the outer circumferential surface of the retainer 45 even when the rolling ball 44 moves freely across the first clearance α1 between the ceiling surface 43c and the top surface 53 in the radial direction.

However, the retainer 45 is manufactured with tolerances for the groove widths WA, WC between the inclined surfaces 45b, 45f of the retainer groove 45d, the predetermined angle θ, the diameter ϕB of the rolling ball 44, etc. Thus, depending on the combination of dimensions, the radial position of the cylindrical part 45a may vary toward the radially inner side relative to the center position in the radial direction according to design calculations. Therefore, the first clearance α1 is preferably set with this variation also taken into account such that the allowance for engagement β2 between the rolling balls 44 and the retainer 45 remains larger than zero. Thus, the rolling balls 44 can be reliably prevented from rolling onto the outer circumferential surface of the cylindrical part 45a (partition portion 45e) of the retainer 45.

The second rounded portion 57 has a second radius of curvature R2 smaller than the first radius of curvature R1 of the first rounded portion 56 (R1>R2). The second rounded portion 57 is disposed so as to be internally tangent (tangentially connected) to the first rounded portion 56 at the point B on the ceiling surface 43c. Thus, a center of the second rounded portion 57 is located on a line connecting the point B and the central axis of the steering operation shaft 20 (ball screw shaft). As shown in FIG. 10, the second rounded portion 57 is formed more toward a groove bottom of the outer circumferential ball rolling groove 23a1 than the range where the first rounded portion 56 is formed.

A point F and the straight portion 58 extending from the second rounded portion 57 toward the groove bottom of the outer circumferential ball rolling groove 23a1 are connected to each other. The point F is a point on the ceiling surface 43c that is located on an extension of a line (not shown) connecting the center point f of the rolling ball 44 from the radial perspective described above and a point (not shown) with which the rolling ball 44 is at that moment in contact inside the outer circumferential ball rolling groove 23a1. The point F is a point on the maximum outside diameter portion of the coupling passage 43b at the opening 43a.

A distance R3 from the central axis of the steering operation shaft 20 (ball screw shaft) to the point F can be expressed by the following Formula (2):

$$R3 = (PCD/2) + (\phi B/2) + \alpha 2 \quad (2)$$

where PCD is a pitch circle diameter (mm); ϕB is the diameter (mm) of the rolling ball 44; and α2 is a second clearance (mm).

Thus, the distance (R3) from the center of the ball screw shaft to the point F is set such that the second clearance α2 is secured between the rolling ball 44 and the point F in a state where the rolling ball 44 is disposed in the outer circumferential ball rolling groove 23a1. As a result, the coupling passage 43b has a smooth shape, which allows smooth circulation of the rolling balls 44.

Figure 12:
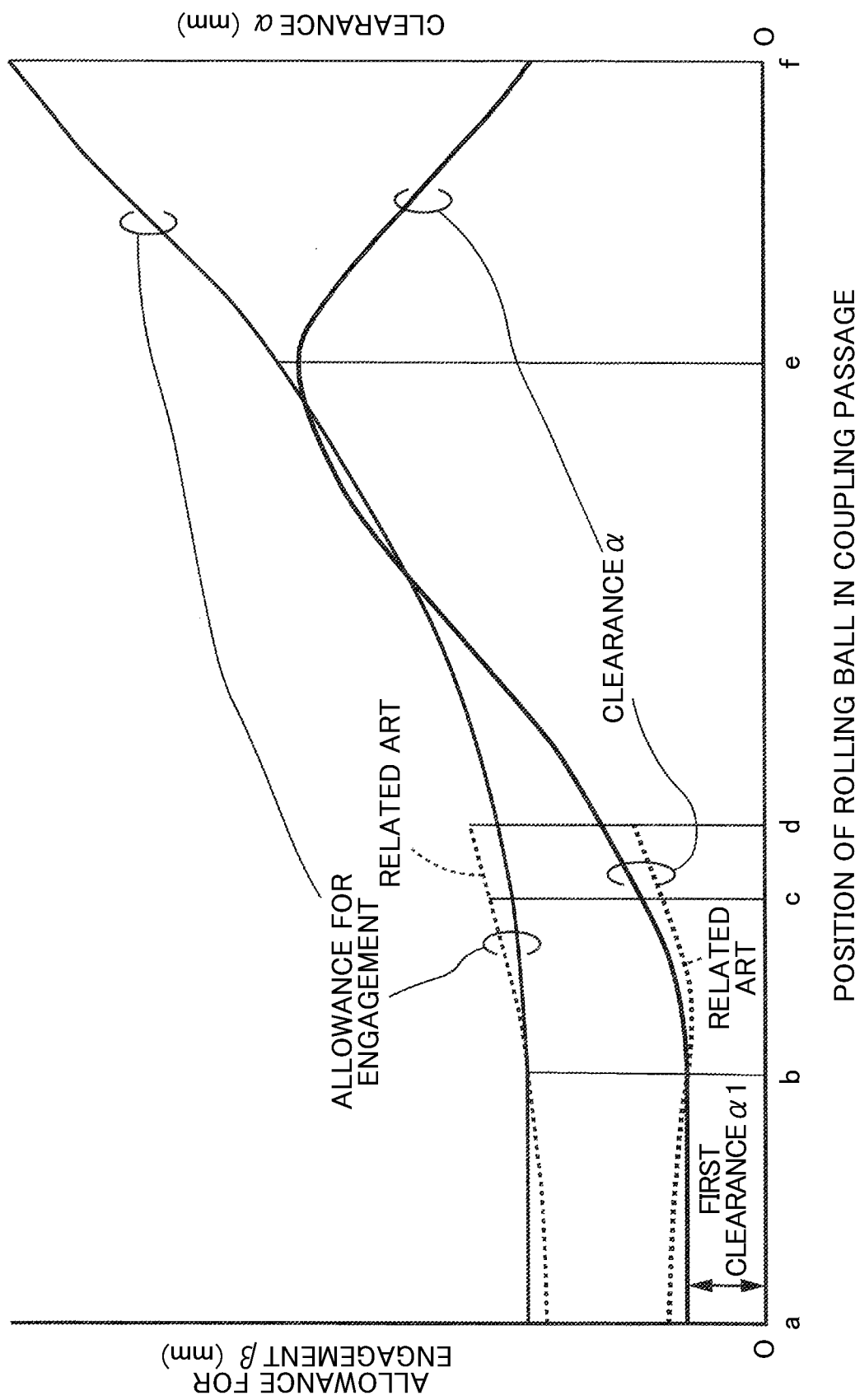
FIG. 12 is a graph showing an allowance for engagement between the rolling ball and the retainer and a clearance at each position of the coupling passage.

Effects of the above embodiment will be described below. FIG. 12 shows calculation data on the clearance α between the rolling ball 44 and the ceiling surface 43c and the allowance for engagement between the retainer 45 and the rolling ball 44 from the axial perspective, at each position from the center point a to the center point f, from the radial perspective in the ball screw device 40 of the above embodiment. For comparison with the present invention, FIG. 12 also shows calculation data (see the dashed lines) in a case where the ceiling surface has a single radius of curvature R as an example of the related art. However, these calculations are based on the assumption that, except for the shape of the ceiling surface, the shapes, dimensions, etc. of the parts composing the ball screw device of the related art are the same as those of the embodiment. In the graph of FIG. 12, the horizontal axis shows the position of the rolling ball 44 in the coupling passage 43b, and the vertical axis shows the clearance α and the dimension of the allowance for engagement between the retainer 45 and the rolling ball 44. In the graph of FIG. 12, the allowances for engagement β1, β2 are represented as the allowance for engagement β, without distinction therebetween.

As indicated by the dashed lines in the graph of FIG. 12, in the related art, the clearance α is largest at the position of the center point a in the range from the center point a to the center point b. The clearance α is smallest at a position beyond the center point b. Accordingly, the allowance for engagement between the retainer and the rolling ball is significantly small at the center point a. Thus, in the vicinity of the position of the center point a, the rolling ball may move across the clearance α toward the radially outer side and roll onto the outer circumferential surface of the retainer.

In the embodiment, by contrast, a constant first clearance α1 is secured in the range from the center point a to the center point b in which the allowance for engagement between the retainer 45 and the rolling ball 44 is smallest in the related art. Accordingly, a constant allowance for engagement β corresponding to the constant first clearance α1 is secured between the retainer 45 and the rolling ball 44. Thus, even when the rolling ball 44 moves across the first clearance α1 toward the radially outer side, the allowance for engagement between the retainer 45 and the rolling ball 44 does not become smaller than the predetermined value, so that the rolling ball 44 is unlikely to roll onto the outer circumferential surface of the retainer 45.

In both the embodiment and the related art, the clearance α becomes larger as the rolling ball 44 moves in the range from the center point b to the center point f beyond the range from the center point a to the center point b. However, in the range from the center point b to the center point f, the rolling ball 44 moves toward the inside of the outer circumferential ball rolling groove 23a1. Thus, an allowance that is large enough for engagement between the retainer 45 and the rolling ball 44 can be secured, so that the rolling ball 44 is unlikely to roll onto the outer circumferential surface of the retainer 45 in both the embodiment and the related art.

Modified Example 1 of the above embodiment will be described below. In the above embodiment, the border between the first rounded portion 56 and the second rounded portion 57 on the ceiling surface 43c is located at the point B. However, the present invention is not limited to this mode. In Modified Example 1, the border between the first rounded portion 56 and the second rounded portion 57 may be located more toward a portion of the ceiling surface 43c where the ceiling surface 43c faces the top surface 53 of the ridge 52 in the radial direction than a point D (see FIG. 10). Thus, the border between the first rounded portion 56 and the second rounded portion 57 may be provided in a range between the point B and the point D.

As shown in FIG. 10, in this case, the point D is a point on the ceiling surface 43c that is located on an extension of a line connecting the center point d (center) of the rolling ball 44 and the point X located on the first line of intersection CR1 that is the line of intersection between the tapered surface 54 and the outer circumferential ball rolling groove 23a1, in a state where the rolling ball 44 is in contact with the point X and the contact surface FA4 of the outer circumferential surface of the rolling ball 44 coincides with the tapered surface 54. The connection between the first rounded portion 56 and the second rounded portion 57 and the connection between the second rounded portion 57 and the point F are the same as in the above embodiment. This example can also produce a considerable effect.

In Modified Example 2, the border between the first rounded portion 56 and the second rounded portion 57 may be provided in a range between the point B and a point C. As shown in FIG. 10, in this case, the point C is a point on the ceiling surface 43c that is located on an extension of a line connecting the center point c of the rolling ball 44 and the point W1 located on the second line of intersection CR2 that is the line of intersection between the top surface 53 and the tapered surface 54, in a state where the rolling ball 44 is in contact with the point W1 and the contact surface FA3 of the outer circumferential surface of the rolling ball 44 at the point W1 coincides with the tapered surface 54 from the circumferential perspective. The connection between the first rounded portion 56 and the second rounded portion 57 and the connection between the second rounded portion 57 and the point F are the same as in the above embodiment. This example can also produce a considerable effect.

In Modified Example 3, the straight portion 58 between the second rounded portion 57 and the point F may be omitted. In other words, the second rounded portion 57 may be directly connected to the point F (not shown). This may cause a slight difference in level between the second rounded portion 57 and the point F, but this example can still produce a considerable effect.

In Modified Example 4, the tapered surfaces 54 of the ridge 52 may be omitted. This example can also produce a similar effect.

According to the above embodiment, the ball screw device 40 includes: the ball screw shaft 20 (steering operation shaft) with the outer circumferential ball rolling groove 23a1 formed spirally in the outer circumferential surface 23a; the ball nut 21 with the inner circumferential ball rolling groove 21a1 formed spirally in the inner circumferential surface, the spiral track 47 being formed between the outer circumferential ball rolling groove 23a1 and the inner circumferential ball rolling groove 21a1; the deflector 43 that is provided in the ball nut 21 and forms the coupling passage 43b that crosses over the ridge 52 between adjacent portions of the outer circumferential ball rolling groove 23a1; the plurality of rolling balls 44 that are housed in array inside the circulation path 51 formed by the substantially one turn of the spiral track 47a and the coupling passage 43b; and the retainer 45 that is disposed between the ball screw shaft 20 (steering operation shaft) and the ball nut 21 and has the retainer groove 45d in which the rolling balls 44 are retained.

The coupling passage 43b is defined by the outer circumferential ball rolling groove 23a1, the ridge 52 between adjacent portions of the outer circumferential ball rolling groove 23a1, and the ceiling surface 43c that is formed on the deflector 43 and faces the outer circumferential ball rolling groove 23a1 and the ridge 52. The top surface 53 of the ridge 52 has a shape of a cylindrical surface centered at the central axis of the ball screw shaft 20. The ceiling surface 43c of the coupling passage 43b has: the first rounded portion 56 at which the projected shape of the ceiling surface 43c seen in the axial direction of the ball screw shaft 20 has the single first radius of curvature R1 centered at the central axis of the ball screw shaft 20, such that the constant first clearance $\alpha 1$ is provided between the rolling balls 44 and the ceiling surface 43c at least in the range in which the rolling balls 44 can roll over the top surface 53 of the ridge 52; and the second rounded portion 57 at which the projected shape of the ceiling surface 43c has the second radius of curvature R2 smaller than the first radius of curvature R1 and which is located more toward the groove bottom of the outer circumferential ball rolling groove 23a1 than the range of the first rounded portion 56.

Thus, the first rounded portion 56 of the ceiling surface 43c is formed such that the constant first clearance $\alpha 1$ is secured between the rolling balls 44 and the ceiling surface 43c at least in the range in which the rolling balls 44 roll over the top surface of the ridge 52 and in which the rolling balls 44 are considered to be most likely to roll onto the outer circumferential surface of the retainer 45. Therefore, the rolling balls 44 can be reliably prevented from rolling onto the outer circumferential surface of the retainer 45.

According to Modified Example 1, the ridge 52 includes the tapered surface 54 that connects the top surface 53 of the ridge 52 and the outer circumferential ball rolling groove 23a1 to each other. When the point located on the first line of intersection CR1 that is the line of intersection between the tapered surface 54 and the outer circumferential ball rolling groove 23a1 is the point X, and the point on the ceiling surface 43c that is a point located on an extension of the line connecting the center of the rolling ball 44 and the point X in the state where the rolling ball 44 is in contact with the point X and the contact surface of the outer circumferential surface of the rolling ball 44 coincides with the tapered surface 54 is the point D, the border between the first rounded portion 56 and the second rounded portion 57 is located more toward the portion of the ceiling surface 43c where the ceiling surface 43c faces the top surface 53 of the ridge 52 in the radial direction than the point D. Thus, the rolling balls 44 are prevented from rolling onto the outer circumferential surface of the retainer 45 over a wider range in the coupling passage 43b.

According to the above embodiment, when the point located on the second line of intersection CR2 that is the line of intersection between the tapered surface 54 and the top surface 53 is the point W, and the point on the ceiling surface 43c that is a point located on an extension of the line connecting the center of the rolling ball 44 and the point W in the state where the rolling ball 44 is in contact with the point W and the contact surface of the outer circumferential surface of the rolling ball 44 coincides with the top surface 53 is the point B, the border is located at the point B. Thus, the range in which the rolling balls 44 are prevented from rolling onto the outer circumferential surface of the retainer 45 is clearly set.

According to the above embodiment, the second rounded portion 57 has the single second radius of curvature R2. Thus, the second rounded portion 57 is easy to process, which contributes to a cost reduction. However, the second rounded portion 57 may instead be formed by joining together a plurality of radii of curvature. Although this causes a cost increase, the clearance between the rolling ball 44 and the ceiling surface 43c can be controlled more accurately.

According to the above embodiment, the ceiling surface 43c of the coupling passage 43b further has the straight portion 58 that is connected to the second rounded portion 57 and extends from the second rounded portion 57 toward the groove bottom of the outer circumferential ball rolling groove 23a1. Thus, the second rounded portion 57 and the spiral track 47 can be smoothly connected to each other.

According to the above embodiment, the steering system 10 includes the ball screw device 40 described in the above embodiment. Thus, the highly reliable steering system 10 including the highly reliable ball screw device 40 in which the rolling balls 44 can be reliably prevented from rolling onto the outer circumferential surface of the retainer 45 is provided.

In the above embodiment, the steering assistance mechanism 30 gives a steering assistance force to the steering operation shaft 20 by using, as a driving source, the motor M of which a rotating shaft is disposed parallel to the ball screw shaft of the steering operation shaft 20. However, the present invention is not limited to this. The steering assistance mechanism may be of a type in which the rotating shaft of the motor is disposed at the same position as the ball screw shaft of the steering operation shaft 20 as in the related art (Japanese Patent No. 5120040). This example is also expected to produce a similar effect.

In the above embodiment, the example where the ball screw device 40 is applied to the electric power steering system 10 etc. has been described. However, the present invention can also be similarly applied to a ball screw device used in a machine tool etc. Moreover, the ball screw device 40 can be applied to any other ball screw devices.

What is claimed is:

1. A ball screw device comprising:
   a ball screw shaft with an outer circumferential ball rolling groove formed spirally in an outer circumferential surface;
   a ball nut with an inner circumferential ball rolling groove formed spirally in an inner circumferential surface, the outer circumferential ball rolling groove and the inner circumferential ball rolling groove forming a spiral track;
   a deflector that is provided in the ball nut and forms a coupling passage that crosses over a ridge between adjacent portions of the outer circumferential ball rolling groove;
   a plurality of rolling balls that are housed in array inside a circulation path formed by (i) a portion of the spiral track and (ii) the coupling passage; and
   a retainer that is disposed between the ball screw shaft and the ball nut and has a retainer groove in which the rolling balls are retained, wherein
   the coupling passage is defined by the outer circumferential ball rolling groove, the ridge between adjacent portions of the outer circumferential ball rolling groove, and a ceiling surface that is formed on the deflector and faces the outer circumferential ball rolling groove and the ridge,
   a top surface of the ridge has a shape of a cylindrical surface centered at a central axis of the ball screw shaft, and
   the ceiling surface of the coupling passage has: a first rounded portion at which a projected shape of the ceiling surface seen in an axial direction of the ball screw shaft has a single first radius of curvature centered at the central axis of the ball screw shaft, such that a first clearance is provided between the rolling balls and the ceiling surface, the first clearance being constant at least in an entirety of a range in which the rolling balls are able to roll over the top surface of the ridge, the range beginning at a center of the top surface, as seen in the axial direction, and ending at an end of the top surface, as seen in the axial direction; and a second rounded portion at which the projected shape of the ceiling surface has a second radius of curvature smaller than the first radius of curvature, the second rounded portion being located closer, than the first rounded portion, to a groove bottom of the outer circumferential ball rolling groove.

2. The ball screw device according to claim 1, wherein the ridge has a tapered surface that connects the top surface of the ridge and the outer circumferential ball rolling groove to each other, and
   a point X is located on a first line of intersection that is a line of intersection between the tapered surface and the outer circumferential ball rolling groove, a point D on the ceiling surface is located on an extension of a line connecting a center of the rolling ball and the point X in a state where the rolling ball is in contact with the point X and a contact surface of an outer circumferential surface of the rolling ball coincides with the tapered surface, and a border between the first rounded portion and the second rounded portion is located closer, than the point D, to a portion of the ceiling surface where the ceiling surface faces the top surface of the ridge in a radial direction.

3. The ball screw device according to claim 2, wherein a point W is on a second line of intersection that is a line of intersection between the tapered surface and the top surface, a point B on the ceiling surface is located on an extension of a line connecting the center of the rolling ball and the point W in a state where the rolling ball is in contact with the point W and the contact surface of the outer circumferential surface of the rolling ball coincides with the top surface, and the border between the first rounded portion and the second rounded portion is located at the point B.

4. The ball screw device according to claim 1, wherein the second rounded portion has a single radius of curvature.

5. The ball screw device according to claim 1, wherein the ceiling surface of the coupling passage further has a straight portion that is connected to the second rounded portion and extends from the second rounded portion toward the groove bottom of the outer circumferential ball rolling groove.

6. A steering system comprising the ball screw device according to claim 1.

7. The ball screw device according to claim 1, further comprising a wall member mounted on an end surface of the ball nut, wherein:
   the retainer includes (i) a cylindrical part and (ii) a flange part protruding outward from the cylindrical part, and the flange part is between the end surface of the ball nut and the wall member.

* * * * *